(12) United States Patent
Karaoguz et al.

(10) Patent No.: US 8,387,106 B2
(45) Date of Patent: Feb. 26, 2013

(54) METHOD AND SYSTEM FOR SECURE LINKING WITH AUTHENTICATION AND AUTHORIZATION IN A MEDIA EXCHANGE NETWORK

(75) Inventors: Jeyhan Karaoguz, Irvine, CA (US); James Bennett, Laguna Beach, CA (US)

(73) Assignee: Broadcom Corporation, Irvine, CA (US)

( * ) Notice: Subject to any disclaimer, the term of this patent is extended or adjusted under 35 U.S.C. 154(b) by 3519 days.

(21) Appl. No.: 10/675,491

(22) Filed: Sep. 30, 2003

(65) Prior Publication Data

US 2004/0117818 A1 Jun. 17, 2004

Related U.S. Application Data

(60) Provisional application No. 60/432,472, filed on Dec. 11, 2002, provisional application No. 60/443,894, filed on Jan. 30, 2003, provisional application No. 60/457,179, filed on Mar. 25, 2003, provisional application No. 60/464,697, filed on Apr. 23, 2003, provisional application No. 60/461,717, filed on Apr. 10, 2003.

(51) Int. Cl.
*H04N 7/16* (2006.01)
(52) U.S. Cl. .......................................... 725/148; 726/10
(58) Field of Classification Search .................. 725/148; 709/222, 226; 726/10; 713/155
See application file for complete search history.

(56) References Cited

U.S. PATENT DOCUMENTS

| | | | |
|---|---|---|---|
| 5,675,647 A * | 10/1997 | Garneau et al. | 380/239 |
| 5,956,716 A * | 9/1999 | Kenner et al. | 707/10 |
| 6,182,094 B1 * | 1/2001 | Humpleman et al. | 715/234 |
| 6,774,926 B1 * | 8/2004 | Ellis et al. | 348/14.01 |
| 6,865,555 B2 * | 3/2005 | Novak | 705/59 |
| 6,934,858 B2 * | 8/2005 | Woodhill | 726/5 |
| 7,302,487 B2 * | 11/2007 | Ylonen et al. | 709/229 |
| 2002/0004832 A1 * | 1/2002 | Yoon et al. | 709/229 |
| 2002/0016971 A1 | 2/2002 | Berezowski et al. | |
| 2002/0073245 A1 * | 6/2002 | Hallford | 709/331 |
| 2002/0143959 A1 * | 10/2002 | El-Baze et al. | 709/228 |
| 2002/0154892 A1 * | 10/2002 | Hoshen et al. | 386/87 |
| 2003/0097655 A1 * | 5/2003 | Novak | 725/31 |
| 2003/0177249 A1 * | 9/2003 | Takanashi et al. | 709/229 |
| 2004/0003051 A1 | 1/2004 | Krzyzanowski et al. | |
| 2004/0133914 A1 * | 7/2004 | Smith et al. | 725/86 |
| 2005/0028208 A1 | 2/2005 | Ellis et al. | |

* cited by examiner

*Primary Examiner* — Scott Beliveau
*Assistant Examiner* — Patrick A Ryan
(74) *Attorney, Agent, or Firm* — Garlick & Markison

(57) ABSTRACT

Certain embodiments of the invention may be found in a method for establishing a communication pathway for subsequent media exchanges between a television display in a first home and storage that contains media in a second home. The method may comprise securely receiving address correlation information associated with the television display in the first home and securely receiving address correlation information associated with the storage in the second home. Affirmative confirmation may be received and/or stored using the received address correlation information associated with at least one of the television display and the storage. The invention may also include verifying that affirmative information has been stored in association with any subsequent media exchanges.

17 Claims, 14 Drawing Sheets

| CHANNELS | << 1PM | 2PM | ... | 6PM | 7PM >> |
|---|---|---|---|---|---|
| HOUR, DAY | | | | | |
| Family Vacations | | | | | |
| Kids sports | | | | | |
| ... | | | | | |
| Vacation in Alaska Video  802 | Normal Estimated Delivery Time: 2 Hrs 13 mins Cost: $0.59 (Without Queuing) | | Showing All day (48 mins) Earliest Order Time: 4:00 PM MPEG-2, 1.5 Mbps | | |
| Vacation in Alaska Video  803 | Express Estimated Delivery Time: 18 mins Cost: $1.20 (With Queuing) | | Showing All day (48 mins) Earliest Order Time: 4:00 PM MPEG-2, 4 Mbps | | |
| Vacation in Alaska Video  804 | Overnight Delivery: available Next Morning Cost: $0.05 (Server Stored) | | Showing All day (48 mins) Earliest Order Time: 4:00 PM MPEG-2, 19 Mbps | | |

Fig. 8

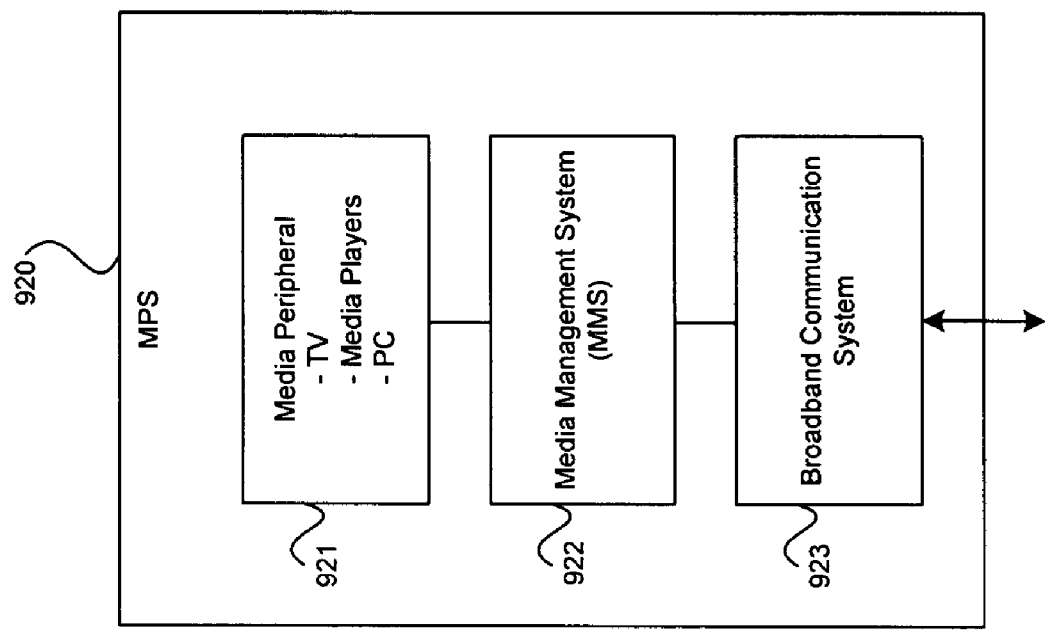

METHOD AND SYSTEM FOR SECURE LINKING WITH AUTHENTICATION AND AUTHORIZATION IN A MEDIA EXCHANGE NETWORK

CROSS-REFERENCE TO RELATED APPLICATIONS/INCORPORATION BY REFERENCE

This application makes reference to, claims priority to, and claims the benefit of:
U.S. Provisional Application Ser. No. 60/432,472 filed Dec. 11, 2002;
U.S. Provisional Application Ser. No. 60/443,894 filed Jan. 30, 2003;
U.S. Provisional Application Ser. No. 60/457,179 filed Mar. 25, 2003;
U.S. Provisional Application Ser. No. 60/464,697 filed Apr. 23, 2003;
U.S. Provisional Application Ser. No. 60/461,717 filed on Apr. 10, 2003; and
U.S. Provisional Application Ser. No. 60/457,179 filed on Mar. 25, 2003.
This application also makes reference to:
U.S. application Ser. No. 10/657,390 filed Sep. 8, 2003; and
U.S. application Ser. No. 10/660,267 filed Sep. 11, 2003.
The above stated applications are incorporated herein by reference in their entirety.

FIELD OF THE INVENTION

Certain embodiments of the invention relate to secure communication in a media exchange network. More specifically, certain embodiments of the invention relate to a method and system for secure linking with authentication and authorization in a media exchange network.

BACKGROUND OF THE INVENTION

Currently, communication in a PC-based environment having Internet connectivity is typically established based on email addresses, medium access control (MAC) addresses and/or Internet protocol (IP) addresses. Many unwanted connections occur with no anonymity or control by the communicating parties.

A user of a personal computer (PC) may receive many unwanted email messages with file attachments because the user's email address is widely distributed or published somewhere. The unwanted or unsolicited messages are generally referred to as spam. Some of the email messages may contain computer viruses that can hurt the user's PC. Many businesses and some individual users set up firewalls to prevent certain types of email messages from getting through, especially those email messages having computer viruses. However, in general, email messages flow across the Internet without any type of authorization or authentication being performed.

A cable service provider (CSP) or a satellite service provider (SSP) may authorize which channels to broadcast and/or should be de-encrypted by a particular user based on the subscription information for that user. In general, a set-top-box in a user's home receives whatever is broadcast to it based on the subscription of the user. A service provider could temporarily override the subscription limits and broadcast certain channels to a user's or subscriber's set-top-box to let the user try those channels. Notwithstanding, in reality, the user essentially has no control of what channels may be broadcast by the service provider and receiver by the user or subscriber.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Certain embodiments of the invention may be found in a method for establishing a communication pathway for subsequent media exchanges between a television display in a first home and storage that contains media in a second home. The method may comprise securely receiving address correlation information associated with the television display in the first home and securely receiving address correlation information associated with the storage in the second home. Affirmative confirmation may be requested, received and/or stored using the received address correlation information associated with the television display and/or the storage.

The invention may also include verifying that affirmative information has been stored in association with any subsequent media exchanges. Address correlation information associated with the television display in the first home and/or address correlation information associated with the storage in the second home may be communicated via an in-band channel and/or an out-of-band channel. The address correlation information associated with the television display in the first home and the address correlation information associated with the storage in the second home may be a digital certificate, a one-time digital certificate, a one-time code, a device identification, a key or a combination thereof. A period for which the address correlation information associated with the television display in the first home is valid and/or the address correlation information associated with the storage in the second home is valid may be limited to a specific duration.

Another aspect of the invention may be found in a method and system that may establish a communication pathway for subsequent media exchange between a first media component in a first home and a second media component in a second home. The invention may comprise receiving address correlation information associated with the first media component in the first home and a routing address associated with the first media component in the first home. Address correlation information associated with the second media component in the second home may be received and a confirmation may be requested using the address correlation information associated with the second media component. The confirmation may also be stored and its storage verified with a subsequent media exchange. The address correlation information in the first home, the second home and/or the routing address may be communicated via an in-band channel and/or an out-of-band channel. The address correlation information in the first home and the second home may be a digital certificate, a one-time digital certificate, a one-time code, a device identification and/or a key. A period for which the address correlation information in the first home is valid and the address correlation information in the second home is valid, may also be limited to a specific duration.

Another aspect of the invention may also be found in a system that supports media exchange between a first home and a second home. The system may comprise a television display having an associated first routing address in the first home and a storage that contains media in a second home. The storage may also have an associated second routing address.

A server or server component may be adapted to establish a secure communication pathway through which media contained in the second home is delivered to the television display in the first home. The server may comprise a memory that may be adapted to store the first routing address and/or the second routing address. The first routing address and/or the second routing address may be communicated via an in-band channel and an out-of-band channel. The server may be adapted to authenticate an initial access of the television display having the associated first routing address and the storage having the associated second routing address.

Various aspects of the invention may also include a method and system for communicating information using secure linking with authentication and authorization. Aspects of the system may comprise at least one processor that may issue access information from a first device to one or more devices including a second device. The first device may be, for example, a media exchange server. At least one of the processors may transfer at least a portion of the access information to a third device. A processor such as a media exchange server processor for the first device may authenticate the access information whenever the third device attempts to transfer media to the second device. At least one of the processors may communicate the access information to devices such as the third device. In one aspect of the invention, the access information may be communicated from the second device to the third device via an in-band channel or an out-of-band channel. A telephone device may be utilized to inform a user of the third device about the access information. The first device may be a media exchange server, while the second device may be a media processing system, a personal computer executing media exchange software, a media peripheral or any combination thereof.

A processor for the first device or the media exchange server may authenticate the access information, thereby permitting communication with the second device. However, if the processor does not authenticate the access information, then transfer of the media between the second device and third device may be denied or prohibited. In an alternate embodiment of the invention, if the processor for the first device does not authenticate the access information, then restricted communication may be permitted between the second and third devices. In accordance with various embodiments of the invention, the access information may be, for example, a digital certificate, a one-time digital certificate, a one-time code, a device identifier, a key or any combination thereof. Notwithstanding, the processor may further limit a period for which the access code is valid.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 8 is an exemplary illustration of a TV guide channel user interface showing several options of a pushed media in accordance with an embodiment of the present invention.

FIG. 9B illustrates an alternative embodiment of a media processing system (MPS) in accordance with various aspects of the present invention.

DETAILED DESCRIPTION OF THE INVENTION

Figure 1:
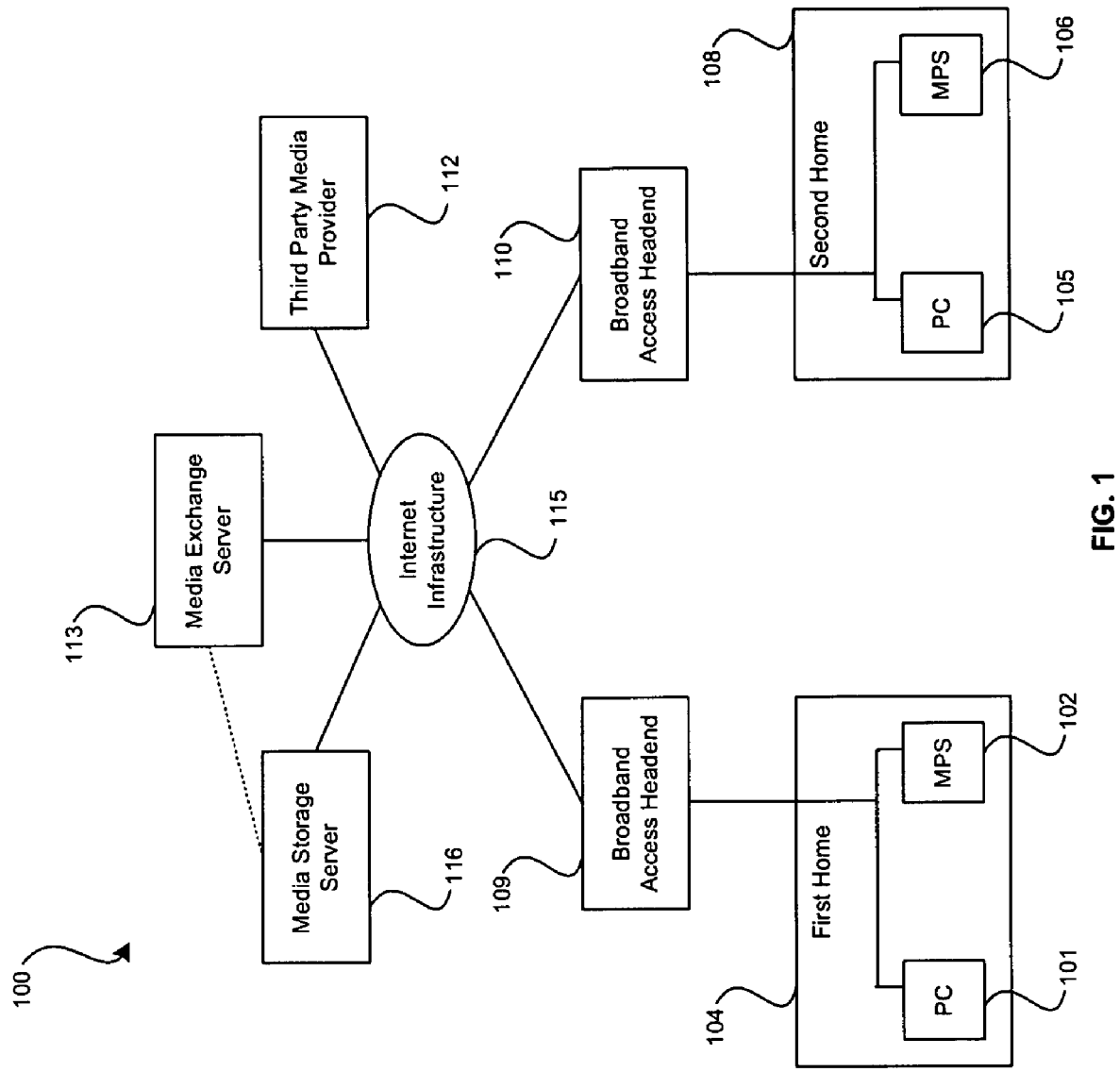
FIG. 1 is a diagram illustrating an embodiment of a media exchange network supporting secure linking with authentication and authorization, in accordance with various aspects of the present invention.

Certain embodiments of the invention may be found in a method for establishing a communication pathway for subsequent media exchanges between a television display in a first home and storage that contains media in a second home. The method may comprise securely receiving address correlation information associated with the television display in the first home and securely receiving address correlation information associated with the storage in the second home. Affirmative confirmation may be received and/or stored using the received address correlation information associated with at least one of the television display and the storage. The invention may also include verifying that affirmative information has been stored in association with any subsequent media exchanges.

Another aspect of the invention may provide a method and system that may be adapted to establish a communication pathway for subsequent media exchange between a first media component in a first home and a second media component in a second home. In this regard, the invention may comprise the step of receiving address correlation information associated with the first media component in the first home and a routing address associated with the first media component in the first home. Address correlation information associated with the second media component in the second home may be received and a confirmation may be requested using the address correlation information associated with the second media component. Accordingly, the confirmation may be stored and its storage verified through, for example, a subsequent media exchange.

Other embodiments of the invention may also be found in a method and system for communicating information using secure linking with authentication and authorization. Aspects of the method may include issuing access information from a first device such as a media exchange server to a second device. At least a portion of the access information may be transferred to a third device. The first device may authenticate the access information whenever the third device attempts to transfer media to the second device. The access information may be communicated from the second device to the third device via an in-band channel and/or an out-of-band channel. The access information may be a digital certificate, a one-time digital certificate, a one-time code, a device identifier, a key or any combination thereof. A user of the third device may also be informed of the access information via a telephone call. The first device may be a media exchange server, while the second device may be a media processing system, a personal computer executing media exchange software, a media peripheral or any combination thereof.

The method may also include permitting the third device to communicate with the second device whenever the first device or the media exchange server authenticates the access information. However, if the access information is not authenticated by the first device, then transfer of the media between the second device and third device may be denied or prohibited. In an alternate embodiment of the invention, if the first device does not authenticate the access information, then restricted communication may be permitted between the second and third devices. The method may further include limiting a period for which the access information is valid.

FIG. 1 is a diagram illustrating an embodiment of a media exchange network 100 supporting secure linking with authentication and authorization, in accordance with various aspects of the present invention. Referring to FIG. 1, the media exchange network 100 may include a PC 101 and a media processing system (MPS) 102 situated at a first location such as a first ($1^{st}$) home 104. The media exchange network 100 may also include a PC 105 and a media processing system 106 located at a second location such as a second ($2^{nd}$) home 108. The PC 101 and the media processing system 102 may be interfaced with a broadband access headend 109. The broadband access headend 109 may include a cable headend, a satellite headend, or an xDSL headend, in accordance with various embodiments of the invention. The PC 101 and the media processing system 102 may include internal modems such as a cable modem and an xDSL modem, or other suitable interface devices that may facilitate communication with the broadband access headend 109. Optionally, the interface device such as a modem may be located externally to the PC 101 and/or the media processing system 102. A personal computer (PC) comprising media exchange software (MES) running on or being executed by the personal computer, may also be referred to as a media processing system.

A media processing system may also comprise a set-top-box (STB), a PC, and/or a television with a media management system (MMS). A media management system may also be referred to as a media exchange software (MES) platform. Notwithstanding, a media management system may include a software platform operating on at least one processor that may provide certain functionality including user interface functionality, distributed storage functionality, networking functionality, and automatic control and monitoring of media peripheral devices. For example, a media management system may provide automatic control of media peripheral devices, automatic status monitoring of media peripheral devices, and inter-home media processing system routing selection. A media processing system may also be referred to as a media-box and/or an M-box. Any personal computer may indirectly access and/or control any media peripheral device in instances where the personal computer may include a media management system. Such access and/or control may be accomplished through various communication pathways via the media processing system or outside of the media processing system. A media processing system may also have the capability to automatically access and control any media peripheral device without user interaction and/or with user intervention. A personal computer (PC) may include media exchange software running on or being executed by the personal computer and may be referred to as a media processing system. The media processing system may also include a speech recognition engine that may be adapted to receive input speech and utilize the input speech control various functions of the media processing system.

Each of the elements or components of the network for communicating media or media exchange network may be identified by a network protocol address or other identifier which may include, but is not limited to, an Internet protocol (IP) address, a media access control (MAC) address and an electronic serial number (ESN). Examples of elements or components that may be identified by such addresses or identifiers may include media processing systems, media management systems, personal computers, media or content providers, media exchange software platforms and media peripherals.

The PC 105 and the media processing system interface 106 may be coupled to a broadband access headend 110. The broadband access headend 110 may include a cable headend, a satellite headend or an xDSL headend, in accordance with various embodiments of the invention. The PC 105 and the media processing system 106 may include internal modems such as a cable modem, xDSL modem or other interface device that may facilitate communication with the broadband access headend 110. Optionally, the interface device may be a modem that may be externally coupled to the PC 105 and/or the media processing system 106.

The media exchange network 100 may also include a third ($3^{rd}$) party media provider 112 and a media exchange server 113. In the case of a single central server arrangement, a single media exchange server may support the media exchange network 100. The broadband access headend 109, the broadband access headend 110, the third ($3^{rd}$) party media provider 112, and the media exchange server 113 may be coupled to the Internet infrastructure 115. In an embodiment of the invention a plurality of media exchange servers may be strategically situated at various points in the media exchange network 100. This may be referred to as a multiserver arrangement.

The media exchange network 100 may also include a media storage server 116 interfaced to the Internet infrastructure 115. The media storage server 116 may communicate with the media exchange server 113 and may provide temporary and/or archival storage for digital media on the media exchange network 100. For example, the media storage server 116 may temporarily store or cache media files that are addressed to certain media processing systems and/or PC's on the media exchange network 100.

The media exchange server 113 may provide various functions for the media exchange network 100 including device IP address registration, device ID registration, channel/program setup and management, serving as a proxy for anonymity, digital rights management, media caching/storage, and billing/tracking. The third ($3^{rd}$) party media provider 112 may include any of a number of providers of digital media or content including, but not limited to, an on-demand movie provider, an advertiser, and an on-demand music provider.

In accordance with an alternative embodiment of the invention, a broadband access headend may be upgraded to a media exchange headend by adding various functionalities. These added functionalities might facilitate the exchange of media on the media exchange network in conjunction with the media exchange server. Accordingly, these functionalities may include distributed networking capability, archival functionality, temporary storage, storage management and digital rights management. The archival functionality may include long term storage, while the temporary storage may aid in the distribution and touting of media.

The media exchange network 100 and the media exchange server 113 may provide functions that may be utilized to solve problems associated with authorizing and establishing secure media exchange links between devices such as PC's and media processing systems on the media exchange network 100. The various elements of the media exchange network 100 may include storage locations for digital media and/or data. The storage locations may include, for example, hard disk drives, a DVD player, a CD player, floppy disk drives, RAM, or any combination thereof. The storage locations may also include, for example, secure digital cards, memory sticks, PCMCIA cards, compact flash cards, or any combination of these. The PC's 101,105 may include desktop PC's, notebook PC's, PC tablets, handheld computers, PDA's, or any computing device.

The media processing systems 102, 106 are essentially enhanced set-top-boxes, for example. The media processing systems 102, 106 may each include a television screen or display for viewing and interacting with various user interfaces, media, data, and/or services that may be available on the media exchange network. User input or interaction may occur via a pointing device such as a mouse and/or a remote control. The PC's 101, 105 may each include a PC monitor for viewing and interacting with various user interfaces, media, data, and/or services that are available on the media exchange network using, for example, a keyboard and mouse. The media processing system 102, 106 and PC's 101, 105 may include functional software to support interaction with the media exchange server 113 on the media exchange network 100, in accordance with various embodiments of the present invention.

Other embodiments of the invention may include various combinations and/or multiple instantiations of the elements of FIG. 1, in accordance with various aspects of the invention. These may include but are not limited to media peripheral devices such as digital cameras, digital camcorders, MP3 players, WMA players, CD players and DVD players.

Figure 2A:
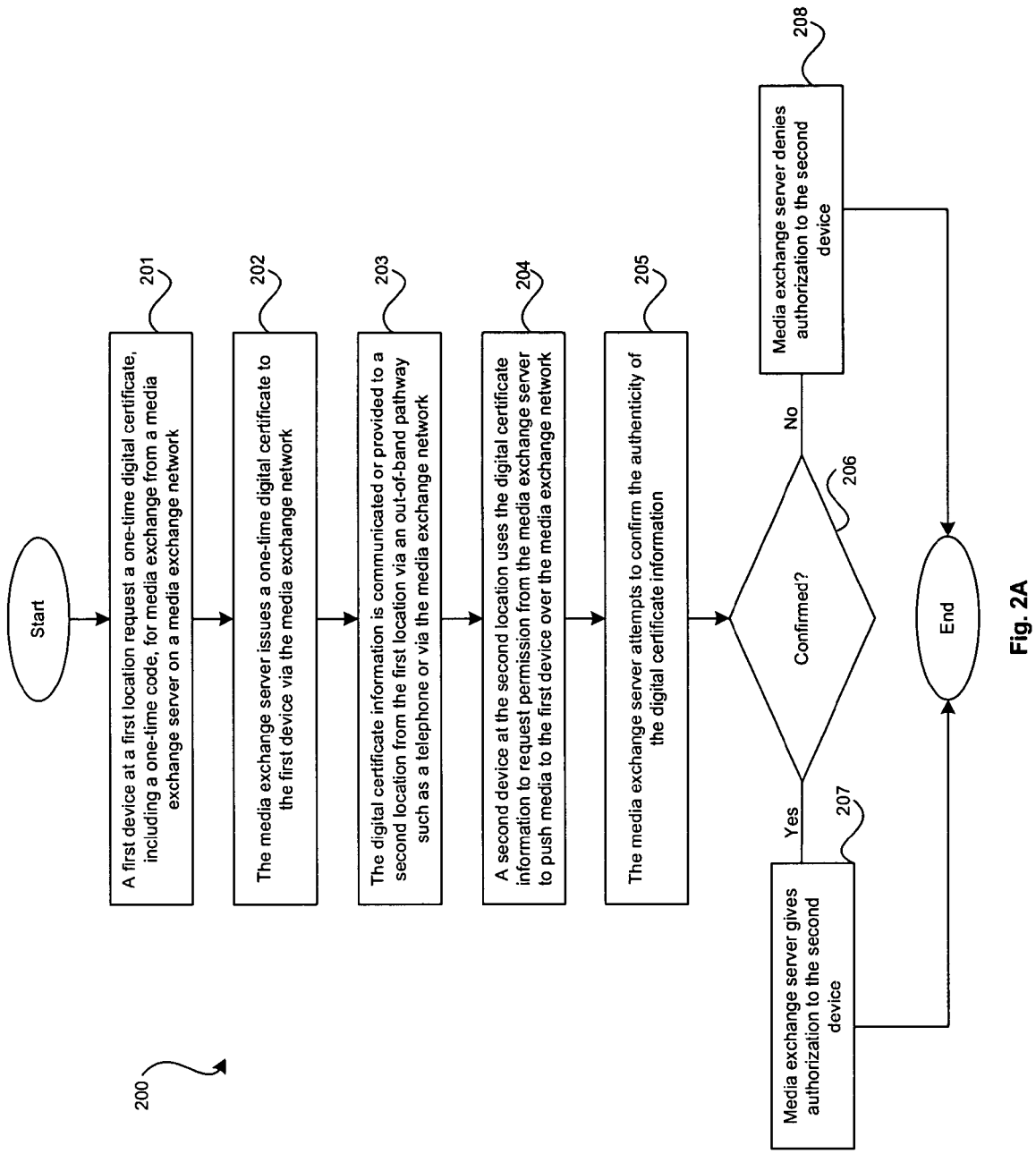
FIG. 2A is a flowchart illustrating an embodiment of a method for performing secure linking with authentication and authorization using one-time digital certificates within the media exchange network of FIG. 1, in accordance with various aspects of the present invention.

FIG. 2A is a flowchart illustrating an embodiment of a method 200 for performing secure linking with authentication and authorization using one-time digital certificates within the media exchange network 100 of FIG. 1, in accordance with various aspects of the present invention. Referring to FIG. 2A, in step 201, a first device at a first location may request a one-time digital certificate, which may be associated with a device identification (ID) of the first device. In this regard, the one-time digital certificate may be requested from a media exchange server and may be utilized for communication or media exchange on a media exchange network. In step 202, the media exchange server may issue a one-time digital certificate to the first device via the media exchange network. In step 203, digital certificate related information may be provided to a second location from the first location via an out-of-band pathway such as a telephone link or via the media exchange network. More specifically, digital certificate related information may be transferred from the first location to the second location via in-band or out-of-band channel or via in-band or out-of-band signaling.

In step 204, a second device situated at the second location may utilize the digital certificate information to request permission from the media exchange server to push media to the first device over the media exchange network. In step 205, the media exchange server may attempt to confirm the authenticity of the digital certificate information provided by the second device. In this regard, confirmation may be achieved by utilizing the device ID of the first device. In step 206, if confirmed then, in step 207, the media exchange server may authorize the second device to push media to the first device over the media exchange network. Otherwise, in step 208, the media exchange server may deny authorization to the second device. The exemplary steps may end after steps 207 and 208.

In accordance with an embodiment of the invention, a one-time digital certificate may contain information such a device ID, a public key, an IP address, a one-time code or pin number, and other information that may be somewhat related to services that may be provided.

In an illustrative embodiment of the invention, referring to FIG. 1, the media processing system 102 that may be situated at the first location or first ($1^{st}$) home 104 may request a one-time digital certificate from the media exchange server 113 to facilitate secure and authorized media exchange on the media exchange network 100. The request may be transmitted or otherwise communicated from the media processing system 102 to the broadband access headend 109, on to the Internet infrastructure 115, and finally to the media exchange server 113. In accordance with an embodiment of the invention, the media processing system 102 may include software or code that may determine or otherwise know the IP address of the media exchange server 113 in order to send the request.

Next, the media exchange server 113 may issue a one-time digital certificate back to the media processing system 102 via the media exchange network 100 following, for example, the reverse path of the request. The user of the media processing system 102 may then place a telephone call to the user of the media processing system 106 situated at the second location or second ($2^{nd}$) home 108 and provide the user at the second home with the digital certificate information. For example, a 5-digit code or pin number included in the one-time digital certificate may be supplied to the user situated at the second home.

The user at the $2^{nd}$ home 108 enters the digital certificate information via the media processing system 106 using, for example, a remote control and requests permission from the media exchange server 113 to push media from the media processing system 106 to the media processing system 102 over the media exchange network 100. The request, which may contain the digital certificate information, may be transmitted or otherwise communicated to the broadband access headend 110, through the Internet infrastructure 115, and finally to the media exchange server 113. Again, in accordance with an embodiment of the invention, the media processing system 106 may include software or other code that may be utilized to acquire or determine the IP address of the media exchange server 113 in order to send the request.

The media exchange server 113 may process the request from the media processing system 106 in order to attempt to confirm the digital certificate information. The media exchange server 113 may confirm the digital certificate information and authorize the media processing system 106 to push media to the media processing system 102 via the media exchange network 100. If, however, the digital certificate information was not confirmed, the media exchange server 113 may deny authorization, thereby preventing the media processing system 106 from pushing media to the media processing system 106 over the media exchange network 100.

In accordance with an embodiment of the present invention, the one-time digital certificate may be valid for a pre-defined period of time. For example, the one-time digital certificate may be valid for one week from its time of issuance. In another aspect of the invention, the one-time password may be pre-defined to be valid for a specified number of uses. For example, the one-time digital certificate may be valid for five (5) media exchanges or data transfers.

In another example, referring to FIG. 1, the PC 105 at the second location or second ($2^{nd}$) home 108 may request a one-time digital certificate from the media exchange server 113 in order to facilitate secure and authorized media exchange on the media exchange network 100. The request may be transmitted from the PC 105 to the broadband access headend 110, onward to the Internet infrastructure 115, and finally to the media exchange server 113. In accordance with an embodiment of the invention, the PC 105 may include software or other code that may acquire or otherwise determine the IP address or MAC address of the media exchange server 113 in order to send the request.

The media exchange server 113 may then issue a one-time digital certificate to the PC 105 via the media exchange network 100 following, for example, the reverse path of the request. The user of the PC 105 may utilize a telephone to call the third ($3^{rd}$) party media provider 112 in order to inform the third ($3^{rd}$) party media provider 112 with the digital certificate information associated with the one-time digital certificate. The digital certificate information associated with the one-time digital certificate may include, but is not limited to, a 5-digit code or pin number.

The third ($3^{rd}$) party media provider 112 may utilize the digital certificate information to request permission from the media exchange server 113 to push media to the PC 105 over the media exchange network 100. The request, which may contain the digital certificate information, may be transmitted to the Internet infrastructure 115, and finally to the media exchange server 113. In this regard, in accordance with an embodiment of the invention, the third ($3^{rd}$) party media provider 112 may include software and/or code that may acquire or otherwise determine an IP address, a MAC address or other identifier of the media exchange server 113 in order to send the request.

The media exchange server 113 may process the request from the ($3^{rd}$) party media provider 112 and attempt to confirm or otherwise validate the digital certificate information. The media exchange server 113 may confirm the digital certificate information and authorize the ($3^{rd}$) party media provider 112 to push media to the PC 105 via the media exchange network 100. If, however, the digital certificate information was not confirmed, the media exchange server 113 may deny authorization and prevent or otherwise restrict the ($3^{rd}$) party media provider 112 from pushing media to the PC 105 over the media exchange network 100.

Figure 2B:
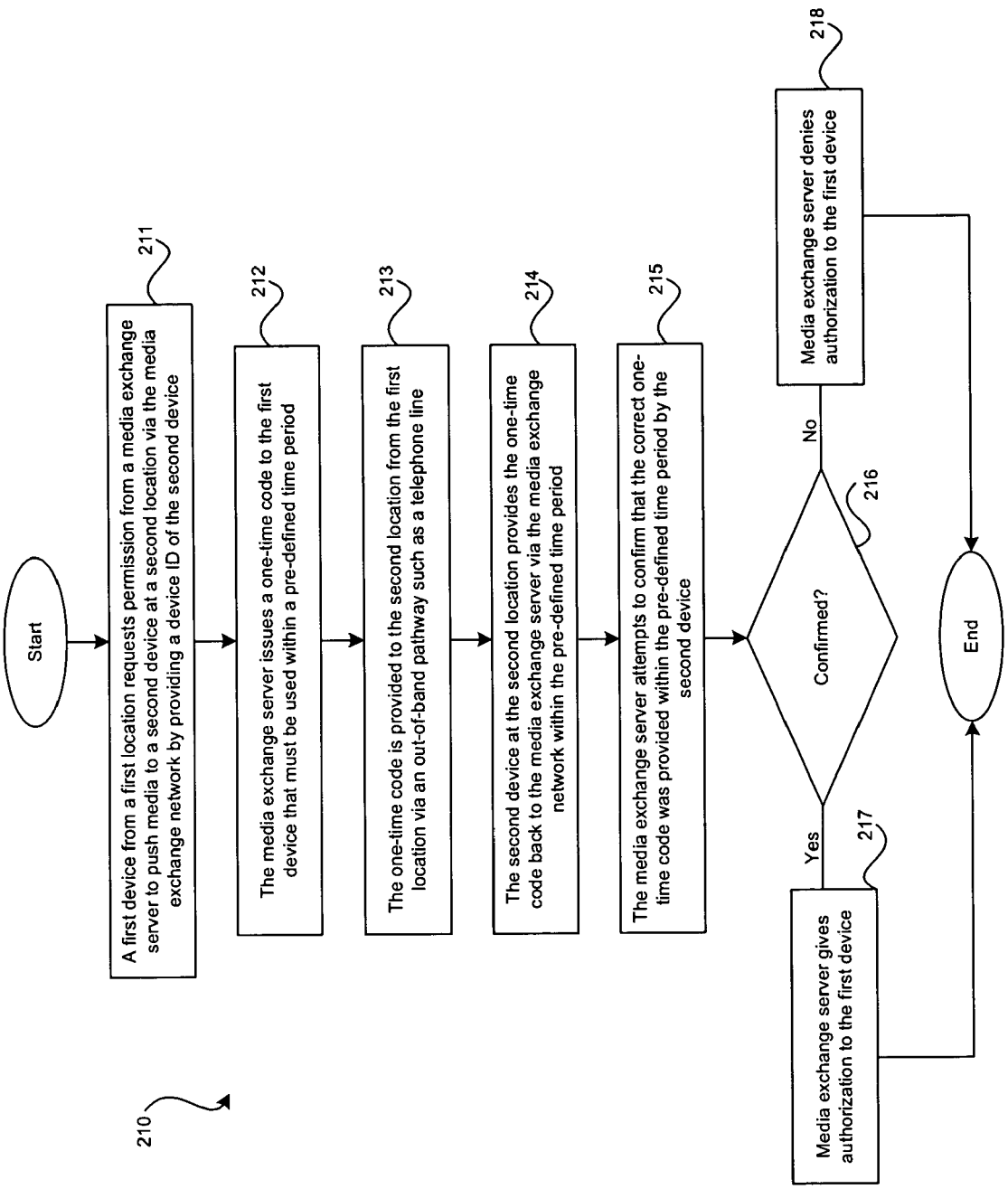
FIG. 2B is a flowchart illustrating an embodiment of a method for performing secure linking with authentication and authorization using one-time codes on the media exchange network of FIG. 1, in accordance with various aspects of the present invention.

FIG. 2B is a flowchart illustrating an embodiment of a method 210 for performing secure linking with authentication and authorization using one-time codes on the media exchange network 100 of FIG. 1, in accordance with various aspects of the present invention. In step 211, a first device at a first location requests permission from a media exchange server to push media to a second device at a second location via a media exchange network by providing a device ID of the second device. In step 212, the media exchange server may issue a one-time code to the first device that may be utilized within a pre-defined time period. In step 213, the one-time code is provided to the second location from the first location via an out-of-band pathway such as, for example, a telephone line. In this regard, a call may be placed over the telephone line and the one-time code transferred via the telephone line.

Notwithstanding, in step 214, the second device at the second location may communicate the one-time code back to the media exchange server via the media exchange network within the pre-defined time period. In step 215, the media exchange server may attempt to confirm or otherwise authenticate that the correct one-time code was provided within the pre-defined time period by the second device. In step 216, if confirmation is successful then, in step 217 the media exchange server may authorize to the first device to push or otherwise communicate media to the second device over the media exchange network. Otherwise, if confirmation is unsuccessful or otherwise fails, then in step 218, the media exchange server may deny authorization to the first device and prevents or otherwise restricts the first device from pushing media to the second device.

Referring to FIG. 1, the PC 101 at the first location or first ($1^{st}$) home 104 may request permission from the media exchange server 113 to push media to the PC 105 at the second location ($2^{nd}$) home 108 via the media exchange network 100. The request may be transmitted from the PC 101 to the broadband access headend 109, to the Internet infrastructure 115, and finally to the media exchange server 113. In accordance with an embodiment of the invention, the PC 101 may include software that may acquire or otherwise determine, for example, an IP address or MAC address of the media exchange server 113. The IP address or the MAC address may be utilized to send the request to the media exchange server 113.

The media exchange server 113 may issue a one-time code back to the PC 101 via the media exchange network 100 following, for example, the reverse path of the request. Another user may enter the code within a pre-defined time period to ensure its validity. The user of the PC 101 may place a telephone call to the user of the PC 105 at the second location or second ($2^{nd}$) home 108 and provides the user at the second ($2^{nd}$) home with the one-time code. If the user at the second ($2^{nd}$) home desires to receive the media from the PC 101, the user may enter the one-time code via the PC 105 and send or otherwise transfer the code within the pre-defined time period to the media exchange server 113 via the media exchange network 100. The one-time code may be transmitted to the broadband access headend 110 via the Internet infrastructure 115, and finally to the media exchange server 113. The PC 105 may include software and/or code that may be utilized to acquire or otherwise determine an IP address or MAC address of the media exchange server 113. The IP address or MAC address may be utilized to send the request to the media exchange server 113.

The media exchange server 113 may process the code received from the PC 105 in order to attempt to confirm or otherwise authenticate the code and the time the code was sent. The media exchange server 113 may confirm or authenticate the code and time and may authorize the PC 101 to push or otherwise communicate the media to the PC 105 via the media exchange network 100. If, however, the code and/or a valid time period for the code was not confirmed or authenticated, the media exchange server 113 may deny authorization and prevent or otherwise restrict the PC 101 from pushing or otherwise communicating the media to the PC 105 over the media exchange network 100.

In another illustrative embodiment of the invention, with reference to FIG. 1, the media processing system 102 at the first location or first ($1^{st}$) home 104 may request permission from the media exchange server 113 to push media to the media processing system 106 at the second location or second ($2^{nd}$) home 108 via the media exchange network 100. The request may be transmitted from the media processing system 102 to the broadband access headend 109 via the Internet infrastructure 115, and finally to the media exchange server 113. In accordance with an embodiment of the invention, the media processing system 102 may include software and/or code that may be utilized to acquire or otherwise determine, for example, an IP address or a MAC address of the media exchange server 113. The determined IP address or MAC address may be utilized to send the request to the media exchange server 113.

The media exchange server 113 may issue a one-time code back to the media processing system 102 via the media exchange network 100 following, for example, the reverse path of the request. The other user should enter the code within a pre-defined time period in order to ensure its validity. The user of the media processing system 102 may provide the code to the user of the media processing system 106 at the second location or the second ($2^{nd}$) home 108. In this regard, the user at the first location or ($1^{st}$) home may place a call to the user at the second location or the second ($2^{nd}$) home 108 and supply the one-time code to the user at the second location or the second ($2^{nd}$) home 108.

The user at the second location or second location or second ($2^{nd}$) home 108, having a desire to receive media from the media processing system 102, may enter the one-time code via the media processing system 106 and sends the code to the media exchange server 113 over the media exchange network 100 within the pre-defined time period. The one-time code may be transmitted to the broadband access headend 110 via the Internet infrastructure 115 to the media exchange server 113. The media processing system 106 may include software and/or code that may acquire or otherwise determine an IP address or MAC address of the media exchange server 113 in order to send the request.

The media exchange server 113 may processes the one-time code from the media processing system 106 in an attempt to confirm or authenticate the one-time code and the time the one-time code was sent. The media exchange server 113 may confirm or otherwise authenticate the one-time code and the time it was sent. If properly confirmed or authorized, the media processing system 102 may push or otherwise communicate media to the media processing system 106 via the media exchange network 100. If, however, the one-time code and/or its associated valid time period was not confirmed, the media exchange server 113 may deny authorization and prevent the media processing system 102 from pushing media to the media processing system 106 over the media exchange network 100.

In another embodiment of the invention, a first user may request a code such as the one-time code from a web site provided by a media exchange server. The first user may access the web site and provide their associated device ID as a paying customer, for example. A code may be generated and displayed on the web site for the first user to view. The viewing or display time for the code may be restricted to a short period such as 10 or 20 seconds, for example. The first user may share the code with other users of the media exchange network via, for example, an email or a telephone. The other users may then communicate with the first user by sending or otherwise transferring the code to the media exchange server. The communication period may be a pre-defined time period. Notwithstanding, once the media exchange server receives the code from another user, the media exchange server may authorize communication between the first user and at least one other user.

Alternatively, a first user may define a list of friends and family members that the first user wishes to communicate with over the media exchange network. The list may be provided to the media exchange server. The list may include names and device ID's of friends and family members, in accordance with various embodiments of the invention. The media exchange server may allow the friends and family members in the list to communicate with the first user via the media exchange network provided the friends and family members properly identify themselves to the media exchange server. These friends and family members may properly identify themselves by providing their legitimate device ID's. As a result, friends and family members may be pre-authorized by a user by including the friends and family members in a list to the media exchange server.

Figure 2C:
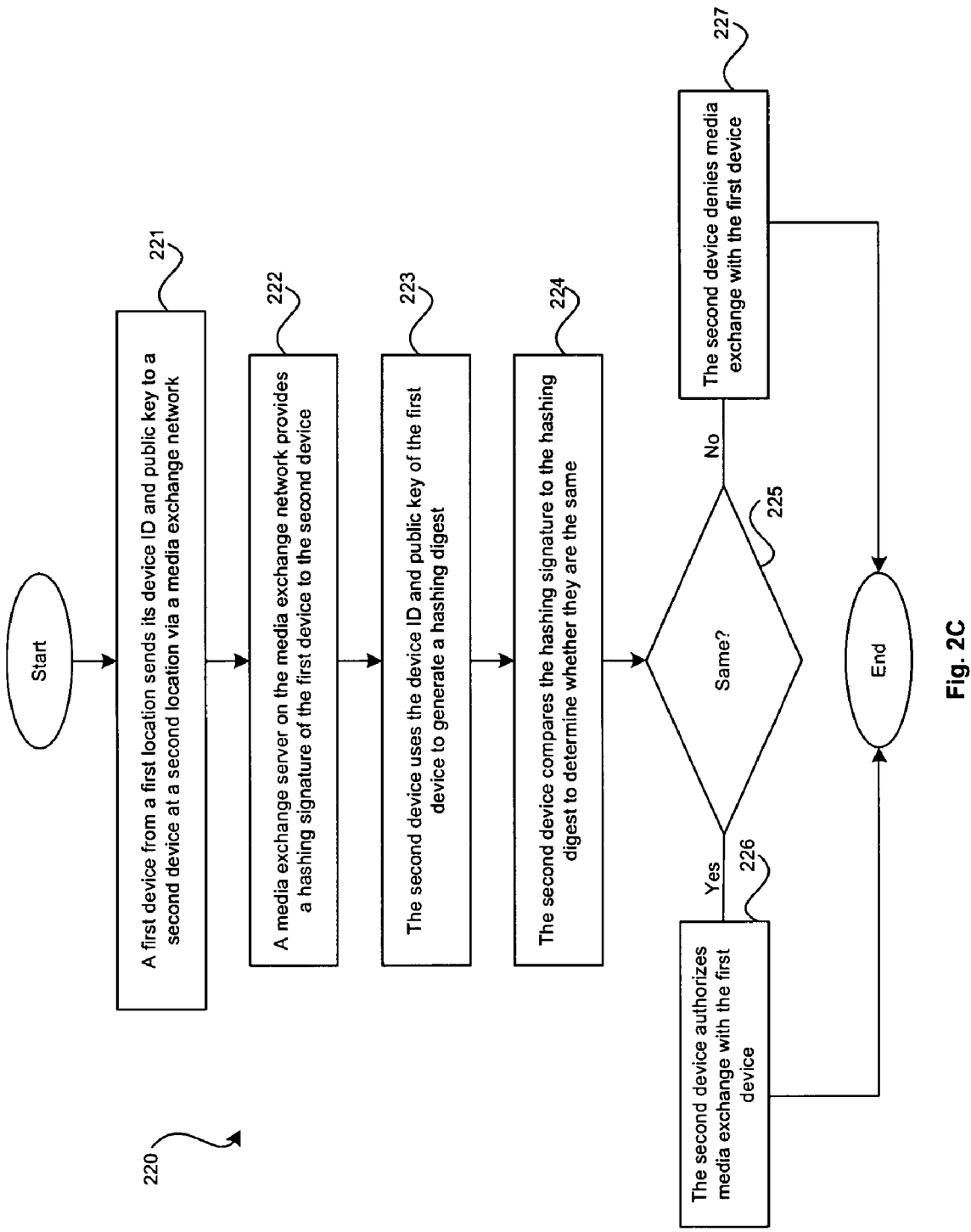
FIG. 2C is a flowchart illustrating an embodiment of a method for performing secure linking with authentication and authorization using hashing techniques on the media exchange network of FIG. 1, in accordance with various aspects of the present invention.

FIG. 2C is a flowchart illustrating an embodiment of a method 220 for performing secure linking with authentication and authorization using hashing techniques on the media exchange network 100 of FIG. 1, in accordance with various aspects of the present invention. Referring to FIG. 2C, in step 221, a first device at a first location may send its device ID and a public key to a second device at a second location via a media exchange network. In step 222, a media exchange server on the media exchange network may provide a hashing signature of the first device to the second device. In step 223, the second device may utilize the device ID and public key of the first device to generate a hashing digest corresponding to the first device. In step 224, the second device compares the hashing signature to the hashing digest to determine whether they are similar. In step 225, if the hashing signature is the same as the hashing digest then, in step 226, the second device may authorize media exchange with the first device. Otherwise, in step 227, the second device may deny media exchange or transfer of media with the first device.

In accordance with an embodiment of the present invention, a public key may be utilized to encrypt digital information and a corresponding private key may be utilized to decrypt the digital information. A public key may be shared with other users of the media exchange network but a private key may be held by a user and not shared. For example, referring to FIG. 1, it may be desirable to transfer or exchange media from the PC 101 at the first location such as a first ($1^{st}$) home 104, to the PC 105 at the second location or second ($2^{nd}$) home 108. The PC 101 may transmit its device ID and public key to the PC 105 at the second location or second ($2^{nd}$) home 108 via the media exchange network 100. The device ID and public key may be transmitted from the PC 101 to the broadband access headend 109 via the Internet infrastructure 115, through the broadband access headend 110, and finally to the PC 105. In accordance with an embodiment of the invention, the PC 101 include software and/or code that may acquire or otherwise determine an IP address, MAC address or other identifier of the PC 105 in order to send the ID and public key. For example, the media exchange server 113 may provide the IP address or the MAC address of the PC 105.

The media exchange server 113, having detected that the PC 101 may be attempting to establish media exchange authorization with the PC 105, may respond by sending or otherwise transferring a hashing signature for the PC 101 to the PC 105 over the media exchange network 100. In this regard, the hashing signature may truly correspond to the PC 101 since the media exchange server 113 may keep a record of hashing signatures for legitimate devices on the media exchange network 100. The hashing signature may be derived from the true device ID and true public key of the PC 101.

The user of the PC 105 at the second location or second ($2^{nd}$) home 108, may want to first verify that the device ID and public key truly came from the PC 101 at the first location or the first ($1^{st}$) home 104 and not from some other disingenuous party. Accordingly, the PC 105 may process the device ID and public key to generate a hashing digest that may match the hashing signature if the device ID and public key truly came from the PC 101. The PC 105 may compare the hashing digest to the hashing signature provided by the media exchange server 113. The PC 105 may confirm that the generated hashing digest is the same as the hashing signature and authorize the PC 101 to exchange media with the PC 105. If the hashing signature did not match the hashing digest, then the PC 105 would have denied authorization to the PC 101 and media exchange or transfer may be prohibited or otherwise restricted.

In an embodiment of the present invention, the media exchange server 113 may be capable of identifying the location of the PC 101 and the PC 105 by their physical connections to the media exchange network 100. In another embodiment of the invention, the media exchange server 113 may be capable of identifying the location of the PC 101 and the PC 105 by their IP addresses, MAC addresses and/or other identifier. In general, once media exchange or transfer between two or more devices has been authorized on the media exchange network, media exchange may occur between the devices. For example, the media processing system 102 may encrypt a media file using the public key of the media processing system 106 and may send the encrypted media file to the media processing system 106. The media processing system 106 may utilize its corresponding private key to decode the encrypted file.

A major challenge is to be able to transfer and share many different types of digital media, data, and services between one device/location and another with ease while being able to index, manage, and store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a media guide user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set-top-boxes or integrated MPS's (media processing systems) may be used with the media exchange network to perform all of the previously described media exchange functions using a remote control with a television screen.

Current set-top-boxes may be software enhanced to create a MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
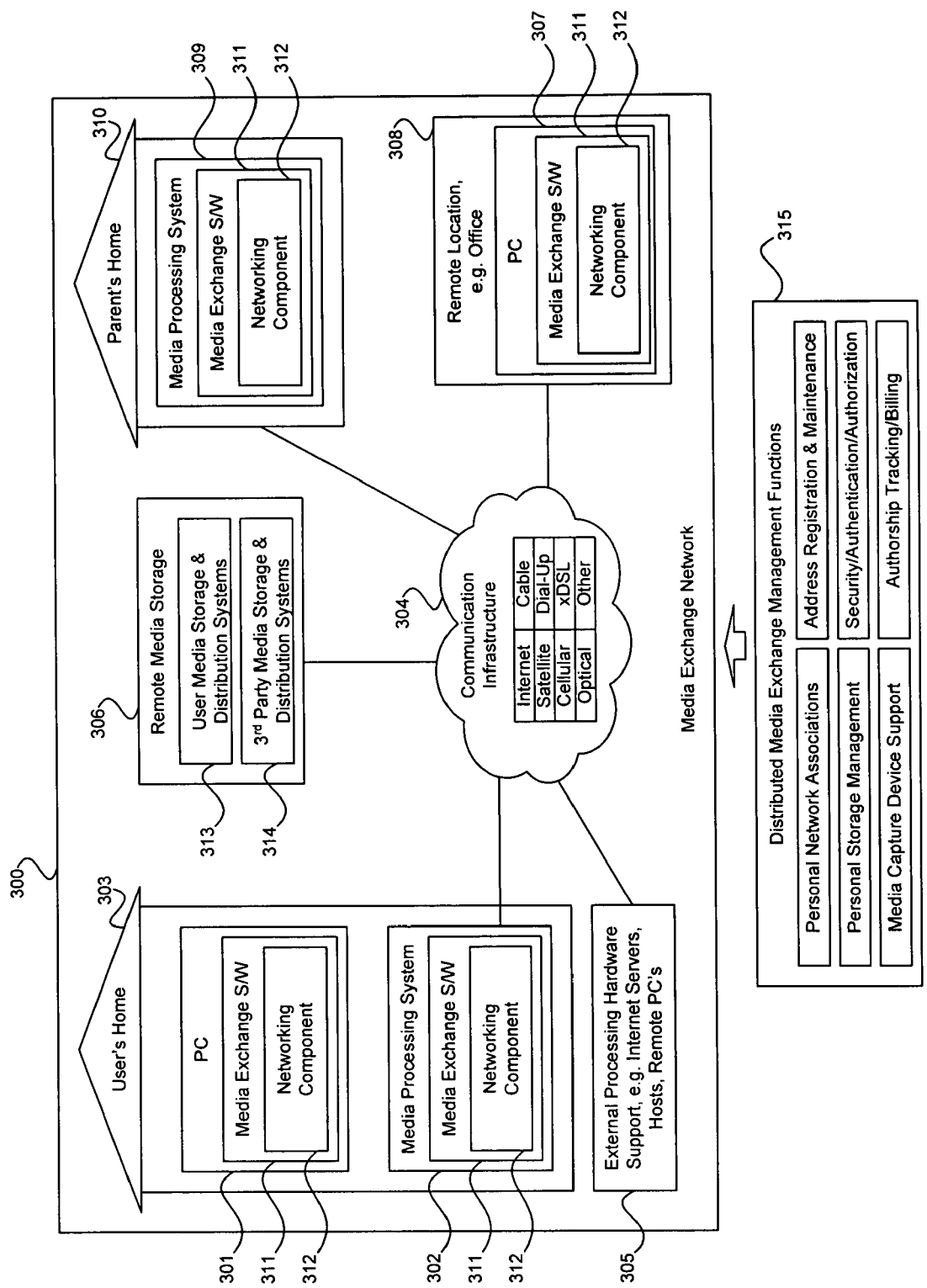
FIG. 3 is a schematic block diagram of a first exemplary media exchange network in accordance with an embodiment of the present invention.

FIG. 3 comprises a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated media guide interface providing a TV channel guide look-and-feel.

The external processing hardware support 305 comprises at least one server such as a centralized internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of internet infrastructure, satellite infrastructure, cable infrastructure, dial-up infrastructure, cellular infrastructure, xDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
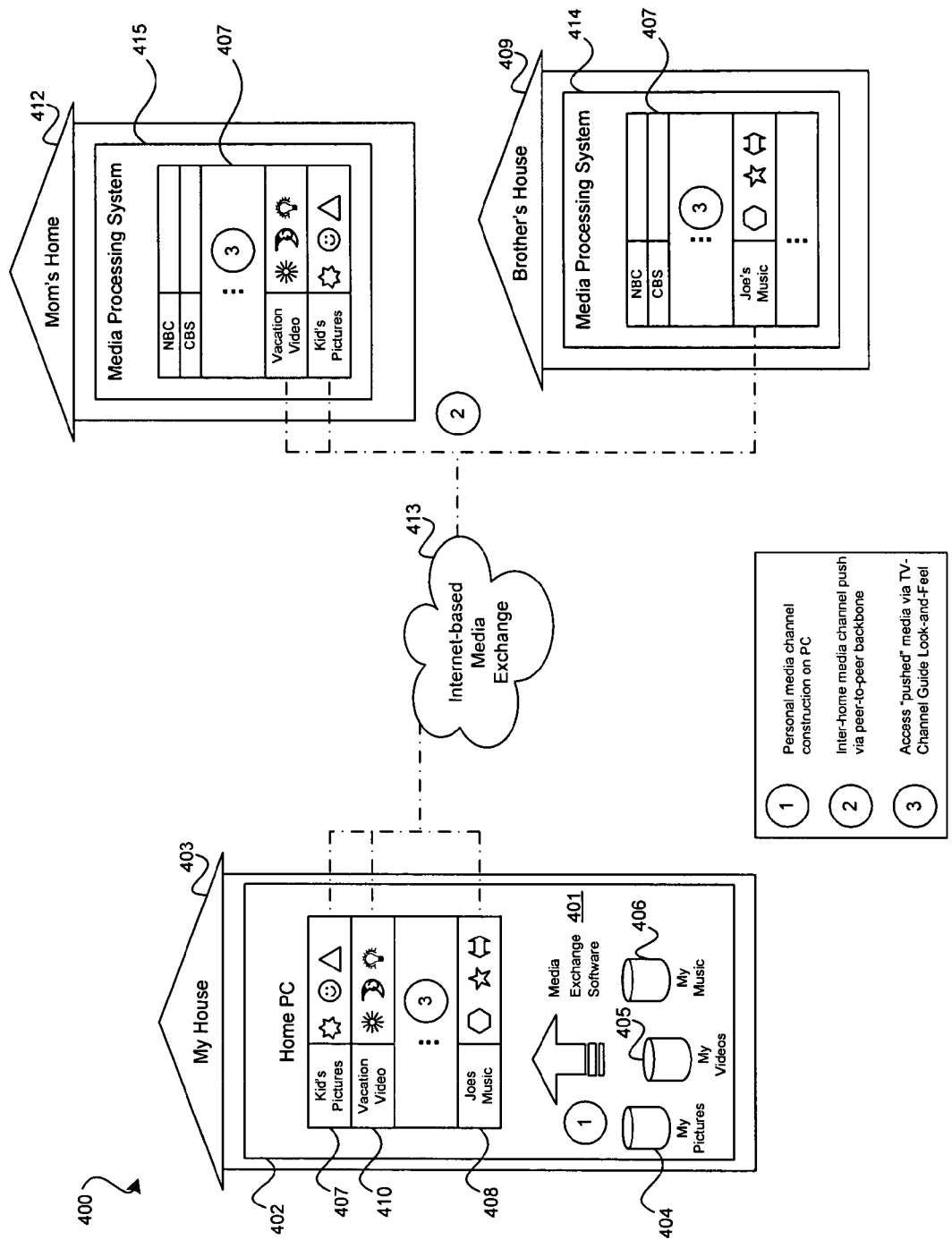
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a media guide user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a media guide user interface 407.

In step 3, brother and/or Mom access the pushed media channels via their respective media processing systems (MPS's) 414 and 415 using their respective MPS TV screens and remote controls.

Figure 5:
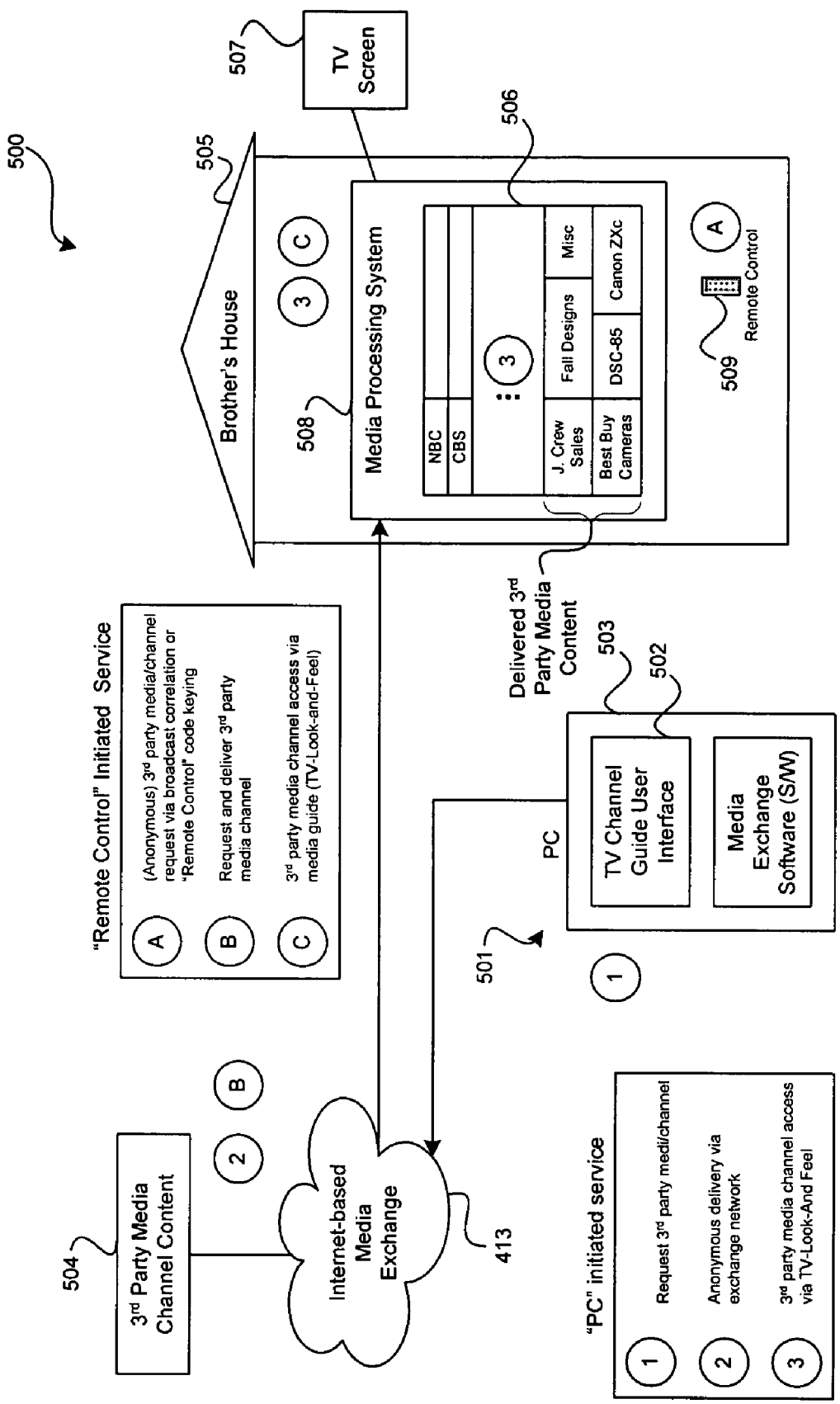
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an internet-based media exchange network 500 using a media guide user interface 502 on a PC 503. In step 2, an anonymous delivery of the requested third-party channel 504 is made to a second party 505 via the internet-based media exchange network 500. In step 3, the second party 505 accesses the third-party channel 504 using a media guide user interface 506 on a TV screen 507 that is integrated into an MPS 508.

Similarly, in step A, an MPS-initiated third-party request is made by a second party 505 via an internet-based media exchange network 500 using a media guide user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a media guide user interface 502 on a PC 503.

Figure 6:
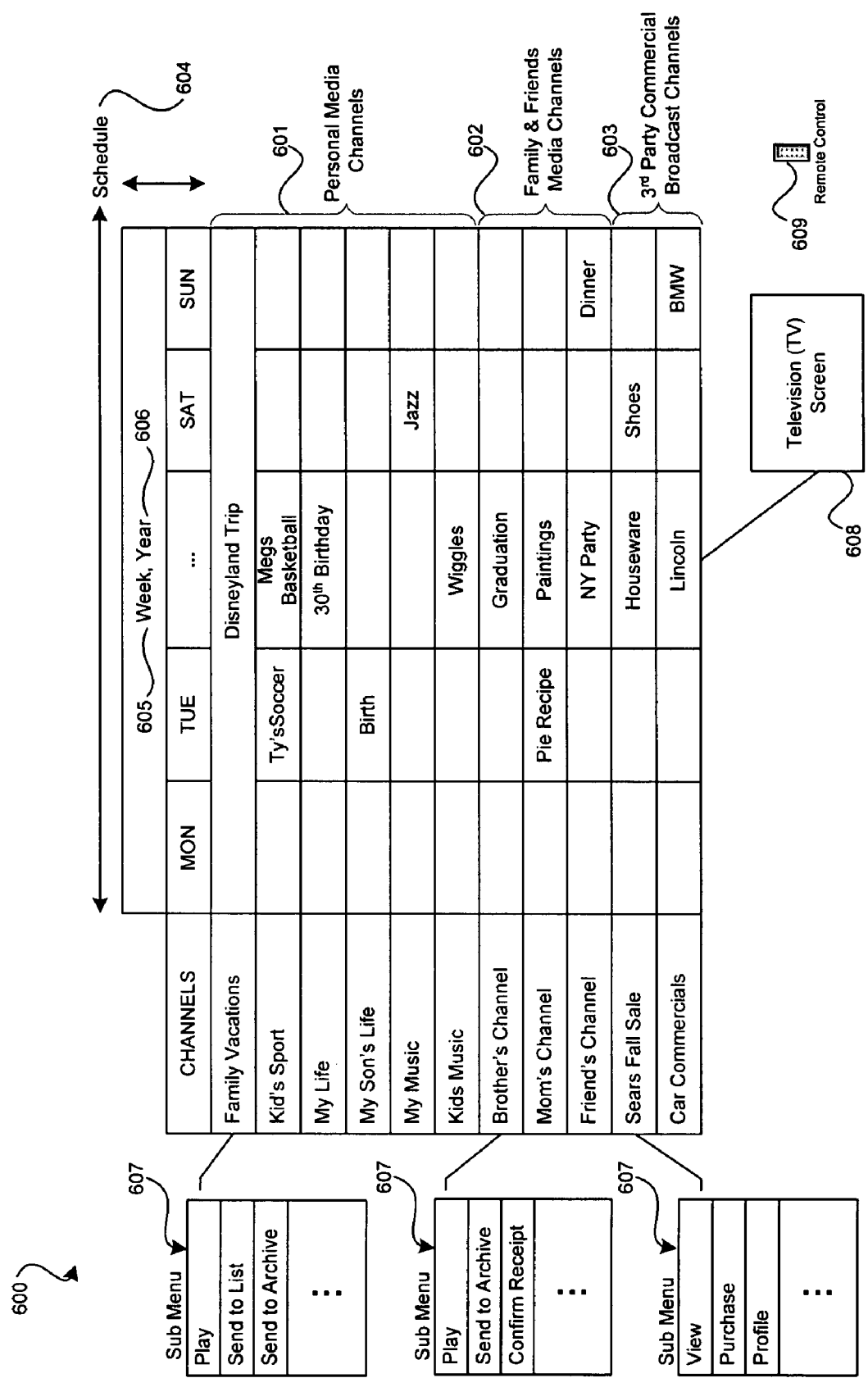
FIG. 6 is an exemplary illustration of a TV guide channel user interface in accordance with an embodiment of the present invention.

FIG. 6 illustrates a media guide user interface 600 in accordance with an embodiment of the present invention. The media guide user interface 600 may be displayed on a TV screen 608 and controlled by a remote control device 609. Also, the media guide user interface 600 may be displayed on a PC monitor and controlled by a keyboard or mouse.

The media guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as "play", "send to list", "send to archive", "confirm receipt", "view", "purchase", and "profile".

Figure 7:
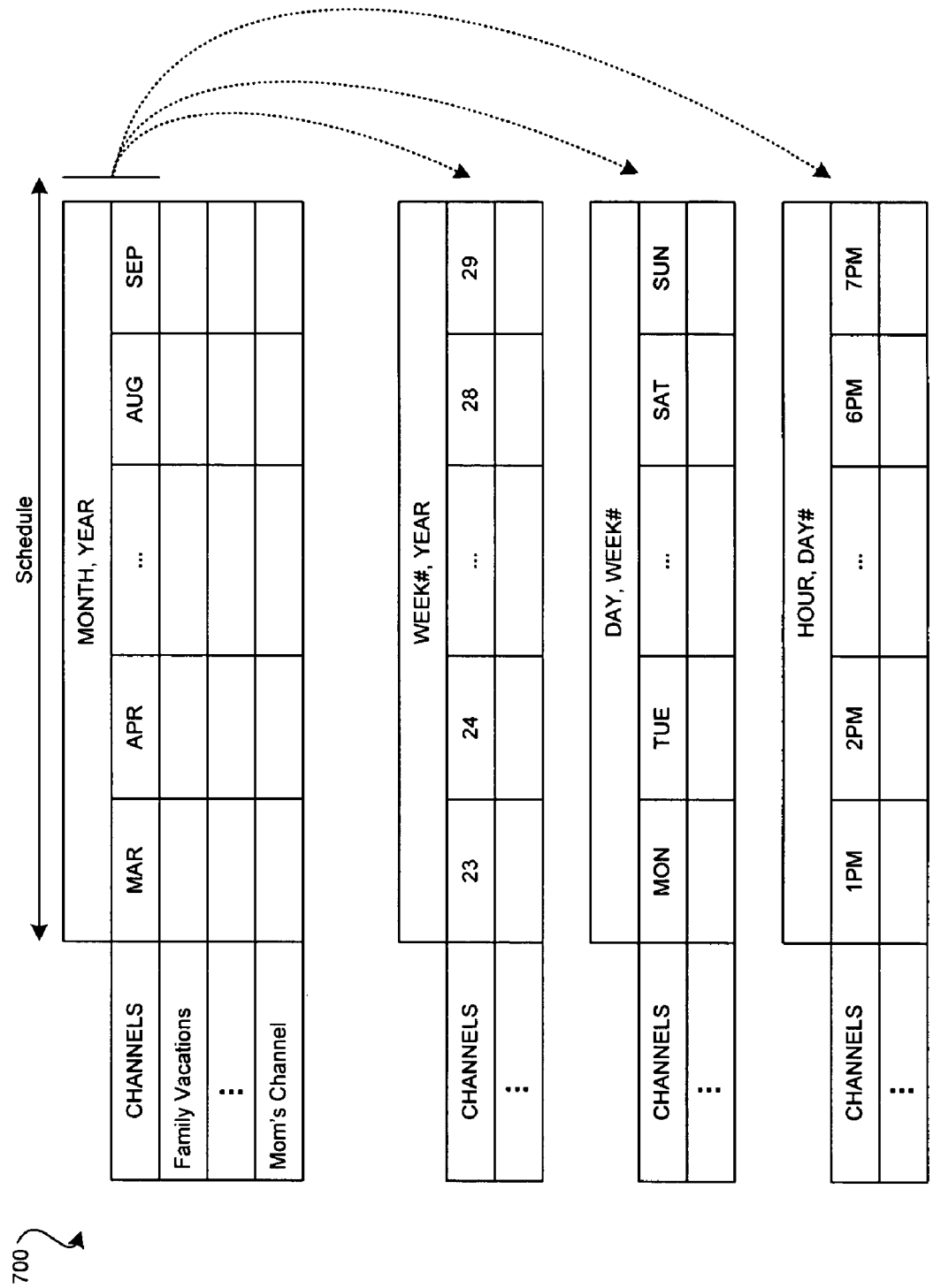
FIG. 7 is an exemplary illustration of several instantiations of a TV guide channel user interface of FIG. 4 in accordance with an embodiment of the present invention.

FIG. 7 illustrates possible multiple instantiations of a media guide user interface 700 in accordance with an embodiment of the present invention. The media guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The media guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
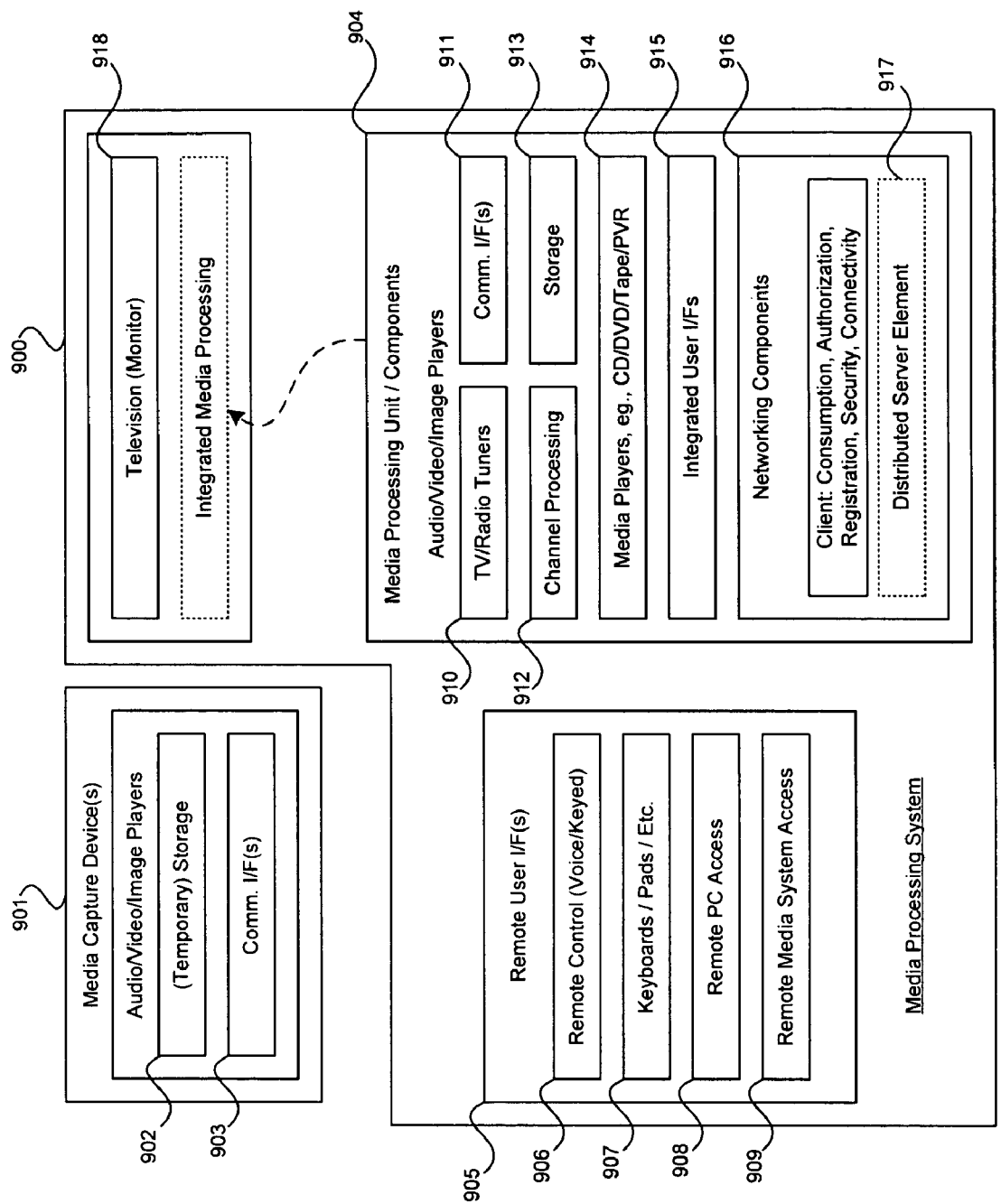
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and-feel), networking components 916 to provide client functions such as consumption (billing), authorization (e.g., using digital certificates and digital ID's), registration, security, and connectivity. In an alternative embodiment of the present invention, the networking components 916 may include a distributed server element 917 that is part of a distributed server.

FIG. 9B illustrates an alternative embodiment of a media processing system (MPS) 920 in accordance with various aspects of the present invention. The MPS 920 is essentially an enhanced set-top-box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and a MP3 player) for video, image, and audio consumption of broadcast and/or personal channels. The broadband communication interface 923 may include internal modems (e.g., a cable modem or DSL modem) or other interface devices in order to communicate with, for example, a cable or satellite headend.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
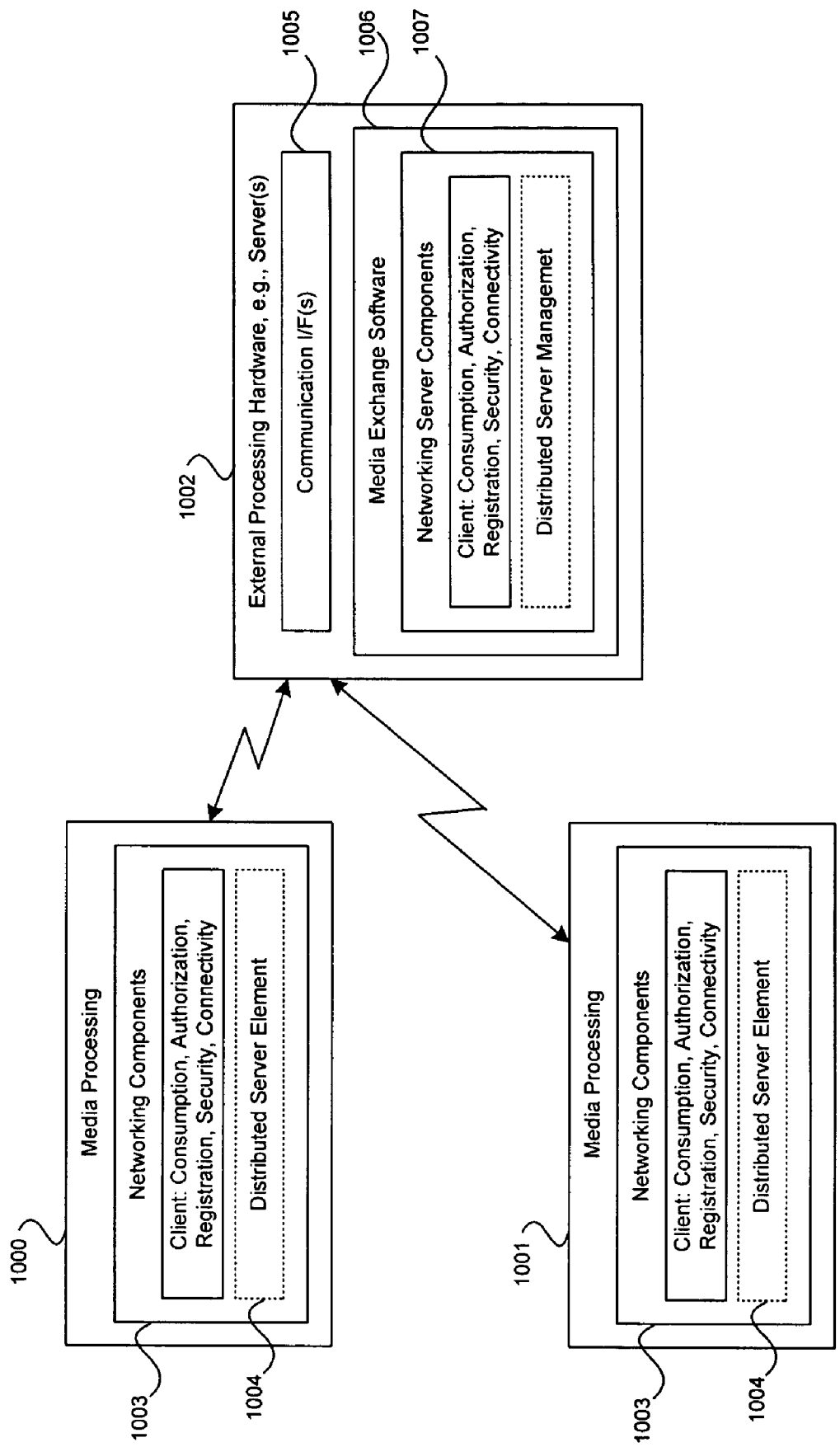
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

Figure 11:
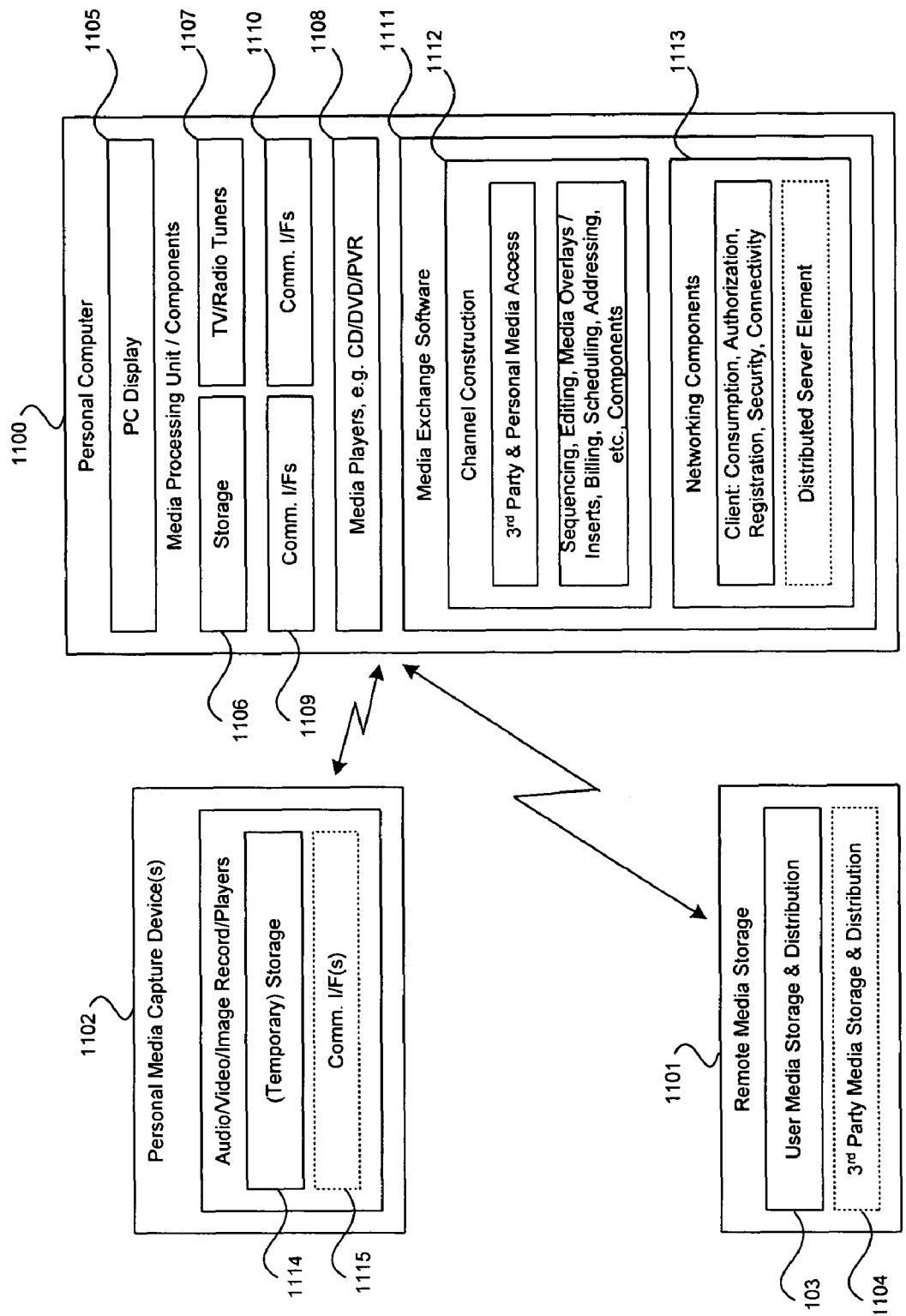
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connect to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9A. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

Aspects of the invention may also be found in a method and system for communicating information using secure linking with authentication and authorization. The method may comprise the step of issuing access information from a first device to one or more devices including a second device. The first device may be, for example, a media exchange server. At least a portion of the access information may be transferred to a third device. The first device may authenticate the access information whenever the third device attempts to transfer media to the second device. The access information may be communicated to one or more devices such as the third device. In one aspect of the invention, the access information may be communicated from the second device to the third device via an in-band channel and/or an out-of-band channel. A user of the third device may also be informed of the access information via a telephone call. The first device may be a media exchange server, while the second device may be a media processing system, a personal computer executing media exchange software, a media peripheral or any combination thereof.

The third device may be permitted to communicate with the second device whenever the first device or the media exchange server authenticates the access information. However, if the access information is not authenticated by the first device, then transfer of the media between the second device and third device may be denied or prohibited. In an alternate embodiment of the invention, if the first device does not authenticate the access information, then restricted communication may be permitted between the second and third devices. The access information may be a digital certificate, a one-time digital certificate, a one-time code, a device identifier, a key or any combination thereof. In one aspect of the invention, the method may further include the step of limiting a period for which the access information is valid.

Another embodiment of the invention may provide a machine-readable storage, having stored thereon, a computer program having at least one information section for communicating information using secure linking with authentication and authorization. The at least one code section may be executable by a machine, thereby causing the machine to perform the steps for communicating information using secure linking with authentication and authorization. In this regard, the invention may comprise code for issuing access information from a first device to one or more devices including a second device. The first device may be media exchange server. The invention may include code for transferring at least a portion of the access information to a third device. The first device may utilize authentication code that may authenticate the access information whenever the third device attempts to transfer media to the second device. Code may be provided to allow access information to be communicated to one or more devices such as the third device. Code may also be provided to facilitate the communication of access information from the second device to the third device via an in-band channel and/or an out-of-band channel. In any case, the invention may further include code that may be utilized to inform a user of the third device of the access information via a telephone call. The first device may be a media exchange server, while the second device may be a media processing system, a personal computer executing media exchange software, a media peripheral or any combination thereof.

The invention may also comprise code that permits the third device to communicate with the second device whenever the first device or the media exchange server authenticates the access information. However, if the access information is not authenticated by the first device, then the code may deny or prohibit transfer of the media between the second device and third device. In an alternate embodiment of the invention, if the first device does not authenticate the access information, then the code may provide restricted communication between the second and third devices. The access information may be a digital certificate, a one-time digital certificate, a one-time code, a device identifier, a key or any combination thereof. In one aspect of the invention, the method may further include code for limiting a period for which the access information may be valid.

Other aspects of the invention may be found in a system that supports media exchange between a first home and a second home. In this regard, the system may comprise a television display having an associated first routing address in the first home and a storage that contains media in a second home. The storage may also have an associated second routing address. A server or server component may be adapted to establish a secure communication pathway through which media contained in the second home is delivered to the television display in the first home. The server may comprise a memory that may be adapted to store the first routing address and/or the second routing address. The first routing address and/or the second routing address may be communicated via an in-band channel and/or an out-of-band channel. The server may be adapted to authenticate an initial access of the television display having the associated first routing address and/or the storage having the associated second routing address.

Other aspects of the invention may be found in a system for communicating information using secure linking with authentication and authorization. The system may comprise at least one processor that may issue access information from a first device such as a media exchange server to one or more devices including a second device. At least one of the processors may transfer a portion or all of the access information to a third device. A processor for the first device, which may be a media exchange server processor, may authenticate the access information whenever the third device attempts to transfer media data and/or service to the second device. Authentication may occur only for an initial communication or it may occur for each subsequent communications. Notwithstanding, the processor may communicate the access information to devices such as the third device via an in-band channel or an out-of-band channel. A telephone device may also be utilized to inform a user of the third device of the access information. The second device may be, for example, a media processing system, a personal computer executing media exchange software, a media peripheral or any combination thereof.

A processor for the first device such as the media exchange server processor may authenticate the access information, thereby permitting communication with the second device. However, in instances where the access information is not properly authenticated by the media exchange server processor, then transfer of the media between the second device and third device may be denied or prohibited. In instances where the media exchange server processor does not authenticate the access information, then restricted communication may be permitted between the second and third devices. The access information may be, for example, a digital certificate, a one-time digital certificate, a one-time code, a device identifier, a key or any combination thereof. The processor may also limit a period for which the access information is valid.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for establishing a communication pathway for subsequent media exchanges between a television display in a first home and storage that contains media in a second home, the method comprising:

securely receiving address correlation information associated with the television display in the first home;

securely receiving address correlation information associated with the storage in the second home;

requesting affirmative confirmation using said received address correlation information associated with one or both of the television display and/or the storage; and storing said affirmative confirmation.

2. The method according to claim 1, comprising associated with the subsequent media exchanges, verifying that said affirmative confirmation has been stored.

3. The method according to claim 2, comprising receiving one or both of said address correlation information associated with the television display in the first home and/or said address correlation information associated with the storage in the second home via one or both of an in-band channel and/or an out-of-band channel.

4. The method according to claim 1, wherein one or both of said address correlation information associated with the television display in the first home and/or said address correlation information associated with the storage in the second home is one or more of a digital certificate, a one-time digital certificate, a one-time code, a device identification and/or a key.

5. The method according to claim 1, comprising limiting a period for which one or both of said address correlation information associated with the television display in the first home and/or said address correlation information associated with the storage in the second home is valid.

6. A method for establishing a communication pathway for subsequent media exchange between a first media component in a first home and a second media component in a second home, the method comprising:
receiving at least one of address correlation information associated with the first media component in the first home and a routing address associated with the first media component in the first home;
receiving address correlation information associated with the second media component in the second home;
requesting confirmation using the address correlation information associated with the second media component;
storing said confirmation; and
associated with the subsequent media exchange, verifying that said confirmation has been stored.

7. A system for communicating information, the system comprising:
at least one processor that issues access information from a first device to at least a second device;
said at least one processor transfers at least a portion of said access information to a third device; and
said at least one processor authenticates said access information by said first device when said third device attempts to transfer at least one of media data and service to said at least said second device.

8. The system according to claim 7, wherein said at least one processor communicates said access information from said at least said second device to said third device.

9. The system according to claim 8, wherein said at least one processor communicates said access information from said at least said second device to said third device via one or both of an in-band channel and/or an out-of-band channel.

10. The system according to claim 8, comprising a telephone device that is utilized to inform a user of said third device of said access information.

11. The system according to claim 7, wherein said first device is a media exchange server.

12. The system according to claim 7, wherein said at least said second device and said third device is one or more of a media processing system, a personal computer executing media exchange software and/or a media peripheral.

13. The system according to claim 7, wherein said at least one processor permits said third device to communicate with said at least said second device, if said access information is authenticated by said first device.

14. The system according to claim 7, wherein said at least one processor one or both of denies and/or restricts said transfer of said at least one of media data and service between said at least said second device, if said access information is not authenticated by said first device.

15. The system according to claim 7, wherein said access information is one or more of a digital certificate, a one-time digital certificate, a one-time code, a device identification and/or a key.

16. The system according to claim 7, wherein said at least one processor limits a period for which said access information is valid.

17. The system according to claim 7, wherein said at least one processor is one or more of a computer processor, a media peripheral processor, a media exchange system processor, a media exchange server processor and/or a media processing system processor.

* * * * *